US011700133B2

(12) United States Patent
Hong et al.

(10) Patent No.: US 11,700,133 B2
(45) Date of Patent: Jul. 11, 2023

(54) ZERO-KNOWLEDGE PROOF-BASED CERTIFICATE SERVICE METHOD USING BLOCKCHAIN NETWORK, CERTIFICATION SUPPORT SERVER USING SAME, AND USER TERMINAL USING SAME

(71) Applicant: Coinplug, Inc., Seongnam-si (KR)

(72) Inventors: Jay Wu Hong, Seoul (KR); Kyoo Hyung Han, Seoul (KR)

(73) Assignee: COINPLUG, INC., Seongnam-Si (KR)

( * ) Notice: Subject to any disclaimer, the term of this patent is extended or adjusted under 35 U.S.C. 154(b) by 0 days.

(21) Appl. No.: 17/787,509

(22) PCT Filed: Oct. 13, 2020

(86) PCT No.: PCT/KR2020/013938
§ 371 (c)(1),
(2) Date: Nov. 21, 2022

(87) PCT Pub. No.: WO2021/137396
PCT Pub. Date: Jul. 8, 2021

(65) Prior Publication Data
US 2023/0071022 A1    Mar. 9, 2023

(30) Foreign Application Priority Data

Dec. 31, 2019 (KR) ........................ 10-2019-0180072

(51) Int. Cl.
*H04L 9/32* (2006.01)
*H04L 9/00* (2022.01)
(52) U.S. Cl.
CPC .......... *H04L 9/3265* (2013.01); *H04L 9/3218* (2013.01); *H04L 9/50* (2022.05)
(58) Field of Classification Search
None
See application file for complete search history.

(56) References Cited

U.S. PATENT DOCUMENTS 11,310,060 B1 *  4/2022  Poelstra ................ H04L 9/3066
2018/0270065 A1 *  9/2018  Brown .................. H04L 9/0861
(Continued)

FOREIGN PATENT DOCUMENTS

| KR | 20180079805 A | 7/2018 |
| KR | 20190114423 A | 10/2019 |
| WO | 2021137396 A1 | 7/2021 |

OTHER PUBLICATIONS

Tabora, Vincent "The Use of Self-Sovereign Identity with Zero-Knowledge Proof (ZKP)" [online] Medium, Oct. 2, 2018 [retrieved Mar. 9, 2023]. Retrieved from the Internet: URL: https://medium.datadriveninvestor.com/self-sovereign-identity-with-zero-knowledge-proof-9a05f36f16da (Year: 2018).*
Foreign Communication from Related Application—Korean Office Action with English Translation dated Mar. 30, 2020, KR Patent Application No. 10-2019-0180072 filed Dec. 31, 2019, 11 pages.
(Continued)

*Primary Examiner* — Linglan Edwards
*Assistant Examiner* — Joshua Raymond White
(74) *Attorney, Agent, or Firm* — Conley Rose, P.C.; Rodney B. Carroll

(57) ABSTRACT

The present invention relates to a zero-knowledge proof-based certificate service method using a blockchain network, the method comprising: (a) a step in which, if a certificate registration request transaction including user trap information generated by using at least one user personal information corresponding to a user and a private key of the user is acquired from a user terminal, a certification support server confirms whether or not the user personal information included in the certificate registration request transaction is authentic; (b) a step in which, if it is confirmed that the user personal information corresponds to the user, the certification support server computes the user personal information and the user trap information included in the certificate registration request transaction by using a commitment scheme, thereby generating a user commitment corresponding to the user personal information; and (c) a step in which
(Continued)

the certification support server transmits a certificate transaction including the user commitment to the blockchain networks such that the blockchain network registers the certificate transaction in a distributed ledger.

4 Claims, 5 Drawing Sheets

(56) References Cited

U.S. PATENT DOCUMENTS

| | | |
|---|---|---|
| 2020/0076615 A1* | 3/2020 | Redpath .................... H04L 9/50 |
| 2020/0279253 A1* | 9/2020 | Ma ....................... G06Q 20/223 |
| 2021/0160223 A1* | 5/2021 | Hwang .................... H04L 9/30 |

OTHER PUBLICATIONS

Foreign Communication from Related Application—International Search Report of the International Searching Authority, International Patent Application No. PCT/KR2020/013938 dated Dec. 17, 2020, 4 pages.

Tabora, Vince, "The Use of Self-Sovereign Identity With Zero-Knowledge Proof (ZKP)," Oct. 2, 2018, 9 pages, Medium.com.

Kurmi, Jitendra et al., "A Survey of Zero-Knowledge Proof for Authentication," International Journal of Advanced Research in Computer Science and Software Engineering, Jan. 2015, vol. 5 Issue 1, 9 pages, ResearchGate.

Kurmi, Jitendra et al., "Commitment scheme," Wikipedia, 8 pages, Wikipedia Foundation, Inc.

\* cited by examiner

ZERO-KNOWLEDGE PROOF-BASED CERTIFICATE SERVICE METHOD USING BLOCKCHAIN NETWORK, CERTIFICATION SUPPORT SERVER USING SAME, AND USER TERMINAL USING SAME

CROSS REFERENCE TO RELATED APPLICATION

This application is a filing under 35 U.S.C. 371 of International Application No. PCT/KR2020/013938, filed Oct. 13, 2020, which claims the benefit of Korean Non-Provisional Patent Application No. 10-2019-0180072, filed on Dec. 31, 2019, the entirety of the contents of both applications being incorporated herein by reference.

FIELD OF THE DISCLOSURE

The present disclosure relates to a platform for managing a certificate based on a zero-knowledge proof using a blockchain network; more particularly, to a method for managing the certificate based on the zero-knowledge proof capable of allowing sensitive information of a user to be safely stored and used by using the blockchain network and a user device using the same.

BACKGROUND OF THE INVENTION

Personal information refers to information that can be used to identify each individual directly or indirectly among information about the individual. The personal information is at the center of conflict between protection of privacy of the individual and collection and use of the personal information for marketing for a company, and thus a risk of infringement of the privacy is increasing.

In addition, if the personal information is collected in a centralized manner and stored in a database, the risk of infringement or leakage of the personal information by the company on purpose or by accident remains. Therefore, there is a need for a method for preventing wide exposure of the personal information of a user.

In order to solve the problem of collecting data in the centralized manner, a method of managing information by using a blockchain network with security and stability is emerging.

The blockchain network uses a distributed ledger that allows a large number of participants to manage a series of synchronized ledgers jointly. Although there is no risk of hacking or the like, since the data of the distributed ledger is open to all of the participants, the personal information of the user has to be encrypted, for example, converted into a hash value, and then be registered in the distributed ledger.

However, there is a risk in that the public key used for identifying the user in the blockchain network has a one to one correspondence with a private key of the user.

Also, there is a problem of needing to provide user identity information to a verifier or a service provider for verifying the user identity information, such as adult certification.

SUMMARY OF THE INVENTION

It is an object of the present disclosure to solve all the aforementioned problems.

It is another object of the present invention to safely save user identity information without disclosing it.

It is still another object of the present invention to be able to verify the user identity information without having to disclose the user identity information.

It is still yet another object of the present invention to prevent unwanted identification caused by using information provided for verification corresponding to the user identity information.

In accordance with one aspect of the present disclosure there is provided a method for managing a certificate based on a zero-knowledge proof using a blockchain network, including steps of: (a) in response to acquiring a certificate registration requesting transaction including at least one piece of user identity information corresponding to a user and user trap information generated by using a secret key of the user from a user device, a certification-supporting server authenticating the user identity information included in the certificate registration requesting transaction; (b) in response to authenticating that the user identity information corresponds to the user, the certification-supporting server generating a user commitment corresponding to the user identity information by applying an operation of a commitment scheme to the user identity information and the user trap information included in the certificate registration requesting transaction; and (c) the certification-supporting server transmitting a certificate transaction including the user commitment to the blockchain network, to thereby instruct the blockchain network to register the certificate transaction in a distributed ledger.

As one example, at the step of (a), the certification-supporting server transmits the user identity information to an authentication server, to thereby instruct the authentication server to authenticate that the user identity information corresponds to the user.

As one example, the commitment scheme binds the user identity information to prevent an alteration thereof and hides the user identity information to prevent an estimation thereof from the user commitment.

As one example, the commitment scheme outputs the user commitment by an operation of $g^\wedge$(the user identity information)*$h^\wedge$(the secret key), wherein g and h are generators, wherein said $g^\wedge$(the user identity information) represents g to the power of the user identity information, and wherein $h^\wedge$(the secret key), which represents h to the power of the secret key, is the user trap information.

In accordance with another aspect of the present disclosure there is provided a method for managing certificate based on a zero-knowledge proof using a blockchain network, including steps of: (a) in response to confirming at least one user identity information to be used for the certificate by a user, a user device generating user trap information by using a secret key of the user and then generating a certification registration requesting transaction including the at least one piece of user identity information and the user trap information; and (b) the user device transmitting the certification registration requesting transaction to a certification-supporting server, to thereby instruct the certification-supporting server to (i) authenticate the user identity information included in the certification registration requesting transaction, (ii) in response to authenticating that the user identity information corresponds to the user, output a user commitment corresponding to the user identity information by applying an operation of a commitment scheme to the user identity information and the user trap information included in the certificate registration requesting transaction, and (iii) transmit a certificate transaction including the user commitment to the blockchain network and thus allow the blockchain network to register the certificate transaction in a distributed ledger.

In accordance with still another aspect of the present disclosure there is provided a method for managing a certificate based on a zero-knowledge proof using a blockchain network, including steps of: (a) on condition that a user commitment, generated by applying an operation of a commitment scheme to user identity information and user trap information, has been registered on a distributed ledger of the blockchain network, wherein the user trap information is generated by using a secret key of a user, in response to acquiring proof information request corresponding to the user identity information from a verification server, a user device (i) generating random nonces, (ii) verifying the user identity information by using the commitment scheme, and (iii) generating user identity proving information corresponding to the random nonces in order to check whether the user identity information satisfies a certain requirement; and (b) the user device transmitting the user identity proving information to the verification server, to thereby instruct the verification server to (i) acquire the user commitment from the blockchain network, (ii) verify the user identity information by using the user commitment acquired from the blockchain network and the user identity proving information acquired from the user device, and (vi) verify whether the user identity information satisfies the certain requirement.

As one example, generators of the commitment scheme are represented as g and h, the user trap information is represented as h^(the secret key), wherein said h^(the secret key) represents said h to the power of the secret key, and the user commitment is represented as comm(the user identity information)=g^(the user identity information)*h^(the secret key), wherein said g^(the user identity information) represents said g to the power of the user identity information, and wherein, at the step of (a), the user device (i) generates a random nonce x and a random nonce y, (ii) generates first user identity proving information g^x*h^y corresponding to the random nonce x and the random nonce y by using the commitment scheme, (iii) transmits the first user identity proving information to the verification server, and (iv) in response to the verification server transmitting a random nonce c, generates (2_1)-st user identity proving information x'=x+c*(user identity information) and (2_2)-nd user identity proving information y'=y+c*(secret key) by referring to the user identity information, the secret key, the random nonce x, the random nonce y, and the random nonce c, and wherein, at the step of (b), the user device transmits the (2_1)-st user identity proving information x' and the (2_2)-nd user identity proving information y' to the verification server, to thereby instruct the verification server to check whether (1) a first verification value g^x*h^y*comm(the user identity information)^c generated by referring to the first user identity proving information g^x*h^y and the user commitment comm(the user identity information) and (2) a second verification value g^x'*h^y' generated by referring to the (2_1)-st user identity proving information x' and the (2_2)-nd user identity proving information y' correspond with each other, thus verifying the user identity information.

As one example, generators of the commitment scheme are represented as g and h, the user trap information is represented as h^(the secret key), wherein said h^(the secret key) represents said h to the power of the secret key, and the user commitment is represented as comm(the user identity information)=g^(the user identity information)*h^(the secret key), wherein said g^(the user identity information) represents said g to the power of the user identity information, and wherein, at the step of (a), the user device (i) generates a random nonce x and a random nonce y, (ii) generates first user identity proving information g^x*h^y corresponding to the random nonce x and the random nonce y by using the commitment scheme, (iii) generates a hash value c=hash (g^x*h^y) by using the first user identity proving information g^x*h^y, and (iv) generates (2_1)-st user identity proving information x'=x+c*(user identity information) and (2_2)-nd user identity proving information y'=y+c*(secret key) by referring to the user identity information, the secret key, the random nonce x, the random nonce y, and the hash value c, and wherein, at the step of (b), the user device transmits the (2_1)-st user identity proving information x', the (2_2)-nd user identity proving information y', and the hash value c to the verification server, to thereby instruct the verification server to check whether (1) a verification value hash ((g^x'*h^y'/(comm(the user identity information)^c)) generated by referring to the (2_1)-st user identity proving information x', the (2_2)-nd user identity proving information y', the hash value c, and the user commitment comm(the user identity information) and (2) the hash value c correspond with each other, thus verifying the user identity information.

In accordance with still yet another aspect of the present disclosure there is provided a certification-supporting server for managing a certificate based on zero-knowledge proof using a blockchain network, including: at least one memory that stores instructions; and at least one processor configured to execute the instructions to perform processes of: (I) in response to acquiring a certificate registration requesting transaction including at least one piece of user identity information corresponding to a user and user trap information generated by using a secret key of the user from a user device, authenticating the user identity information included in the certificate registration requesting transaction; (II) in response to authenticating that the user identity information corresponds to the user, generating a user commitment corresponding to the user identity information by applying an operation of a commitment scheme to the user identity information and the user trap information included in the certificate registration requesting transaction; and (III) transmitting a certificate transaction including the user commitment to the blockchain network, to thereby instruct the blockchain network to register the certificate transaction in a distributed ledger.

As an example, at the process of (I), the processor transmits the user identity information to an authentication server, to thereby instruct the authentication server to authenticate that the user identity information corresponds to the user.

As an example, the commitment scheme binds the user identity information to prevent an alteration thereof and hides the user identity information to prevent an estimation thereof from the user commitment.

As an example, the commitment scheme outputs the user commitment by an operation of g^(the user identity information)*h^(the secret key), wherein g and h are generators, wherein said g^(the user identity information) represents g to the power of the user identity information, and wherein h^(the secret key), which represents said h to the power of the secret key, is the user trap information.

In accordance with still yet another aspect of the present disclosure there is provided a user device for managing certificate based on a zero-knowledge proof using a blockchain network, including: at least one memory that stores instructions; and at least one processor configured to execute the instructions to perform processes of: (I) in response to confirming at least one user identity information to be used for the certificate by a user, generating user trap information by using a secret key of the user and then generating a certification registration requesting transaction including the at least one piece of user identity information and the user trap information; and (II) transmitting the certification registration requesting transaction to a certification-supporting server, to thereby instruct the certification-supporting server to (i) authenticate the user identity information included in the certification registration requesting transaction, (ii) in response to authenticating that the user identity information corresponds to the user, output a user commitment corresponding to the user identity information by applying an operation of a commitment scheme to the user identity information and the user trap information included in the certificate registration requesting transaction, and (iii) transmit a certificate transaction including the user commitment to the blockchain network and thus allow the blockchain network to register the certificate transaction in a distributed ledger.

In accordance with still yet another aspect of the present disclosure there is provided a user device for managing a certificate based on a zero-knowledge proof using a blockchain network, including: at least one memory that stores instructions; and at least one processor configured to execute the instructions to perform processes of: (I) on condition that a user commitment, generated by applying an operation of a commitment scheme to user identity information and user trap information, has been registered on a distributed ledger of the blockchain network, wherein the user trap information is generated by using a secret key of a user, in response to acquiring proof information request corresponding to the user identity information from a verification server, (i) generating random nonces, (ii) verifying the user identity information by using the commitment scheme, and (iii) generating user identity proving information corresponding to the random nonces in order to check whether the user identity information satisfies a certain requirement; and (II) transmitting the user identity proving information to the verification server, to thereby instruct the verification server to (i) acquire the user commitment from the blockchain network, (ii) verify the user identity information by using the user commitment acquired from the blockchain network and the user identity proving information acquired from the user device, and (vi) verify whether the user identity information satisfies the certain requirement.

As an example, generators of the commitment scheme are represented as g and h, the user trap information is represented as h^(the secret key), wherein said h^(the secret key) represents said h to the power of the secret key, and the user commitment is represented as comm(the user identity information)=g^(the user identity information)*h^(the secret key), wherein said g^(the user identity information) represents said g to the power of the user identity information, and wherein, at the process of (I), the processor (i) generates a random nonce x and a random nonce y, (ii) generates first user identity proving information g^x*h^y corresponding to the random nonce x and the random nonce y by using the commitment scheme, (iii) transmits the first user identity proving information to the verification server, and (iv) in response to the verification server transmitting a random nonce c, generates (2_1)-st user identity proving information x'=x+c*(user identity information) and (2_2)-nd user identity proving information y'=y+c*(secret key) by referring to the user identity information, the secret key, the random nonce x, the random nonce y, and the random nonce c, and wherein, at the process of (II), the processor transmits the (2_1)-st user identity proving information x' and the (2_2)-nd user identity proving information y' to the verification server, to thereby instruct the verification server to check whether (1) a first verification value g^x*h^y*comm(the user identity information)^c generated by referring to the first user identity proving information g'x*h^y and the user commitment comm(the user identity information) and (2) a second verification value g^x'*h^y' generated by referring to the (2_1)-st user identity proving information x' and the (2_2)-nd user identity proving information y' correspond with each other, thus verifying the user identity information.

As an example, generators of the commitment scheme are represented as g and h, the user trap information is represented as h^(the secret key), wherein said h^(the secret key) represents said h to the power of the secret key, and the user commitment is represented as comm(the user identity information)=g^(the user identity information)*h^(the secret key), wherein said g^(the user identity information) represents said g to the power of the user identity information, and wherein, at the process of (I), the processor (i) generates a random nonce x and a random nonce y, (ii) generates first user identity proving information g^x*h^y corresponding to the random nonce x and the random nonce y by using the commitment scheme, (iii) generates a hash value c=hash (g^x*h^y) by using the first user identity proving information g^x*h^y, and (iv) generates (2_1)-st user identity proving information x'=x+c*(user identity information) and (2_2)-nd user identity proving information y'=y+c*(secret key) by referring to the user identity information, the secret key, the random nonce x, the random nonce y, and the hash value c, and wherein, at the process of (II), the processor transmits the (2_1)-st user identity proving information x', the (2_2)-nd user identity proving information y', and the hash value c to the verification server, to thereby instruct the verification server to check whether (1) a verification value hash ((g^x'*h^y'/(comm(the user identity information)^c)) generated by referring to the (2_1)-st user identity proving information x', the (2_2)-nd user identity proving information y', the hash value c, and the user commitment comm(the user identity information) and (2) the hash value c correspond with each other, thus verifying the user identity information.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED

Figure 1:
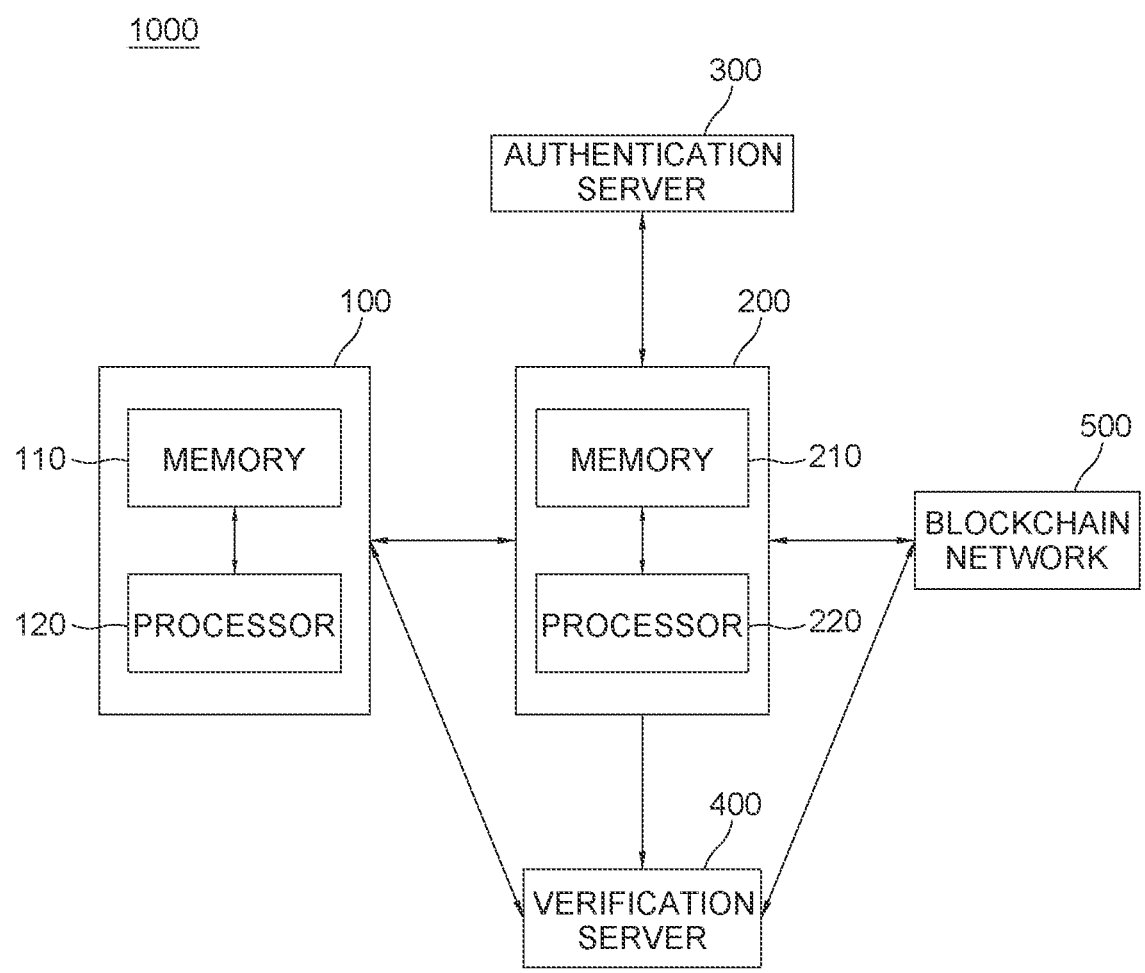
FIG. 1 is a drawing schematically illustrating a system for managing a certificate based on a zero-knowledge proof using a blockchain network in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing schematically illustrating a system for managing a certificate based on a zero-knowledge proof using a blockchain network in accordance with one example embodiment of the present disclosure. Referring to FIG. 1, the system 1000 may include a user device 100, a certification-supporting server 200, an authentication server 300, a verification server 400, and the blockchain network 500.

First, the user device 100 may be used for displaying information served to a user, and for managing user identity information related to certifying the user. It may include a PC (Personal Computer), a mobile computer, a PDA/EDA, a mobile phone, a smart phone, a tablet, etc. However, the user device 100 is not limited thereto, and may include any communication device like a digital camera, a personal navigation device, and a mobile gaming device, etc. capable of wired and wireless communication. Herein, the user device 100 may include a memory 110 for storing instructions for managing the certificate based on the zero-knowledge proof using the blockchain network 500 and a processor 120 for performing processes of managing the certificate based on the zero-knowledge proof using the blockchain network 500 according to the instructions stored in the memory 110.

Next, the certification-supporting server 200 may issue a user certificate based on the blockchain network 500, and therefore may include a memory 210 for storing instructions for managing the certificate based on the zero-knowledge proof using the blockchain network 500 and a processor 220 for performing processes of managing the certificate based on the zero-knowledge proof using the blockchain network 500 according to the instructions stored in the memory 210. Herein, the certification-supporting server 200 may be a server corresponding to at least one of nodes in the blockchain network 500, another server capable of managing the nodes of the blockchain network 500, or a transaction server.

Specifically, the certification-supporting server 200 may typically achieve a desired system performance by using combinations of at least one computing device such as a computer processor, a memory, a storage, an input device, an output device, or any other conventional computing components, at least one electronic communication device such as a router or a switch, at least one electronic information storage system such as a network-attached storage (NAS) device or a storage area network (SAN), and at least one computer software, i.e., any instructions that allow the computing device to function in a specific manner.

The communication part of such devices may transmit requests to and receive responses from other linked devices. As one example, such requests and responses may be carried out by the same TCP (transmission control protocol) session, but the scope of the present disclosure is not limited thereto. For example, they could be transmitted and received as UDP (user datagram protocol) datagrams.

Also, the processors of such devices may include hardware configuration of MPU (Micro Processing Unit) or CPU (Central Processing Unit), cache memory, data bus, etc. Additionally, any OS (operating system) and software configuration of applications that achieve specific purposes may be further included.

Next, the authentication server 300 may authenticate whether the user identity information corresponds to the user, and may include a national agency server for managing the user identity information corresponding to the user or a server for providing a service of authenticating the user identity information corresponding to the user.

Next, the verification server 400 may verify the user identity information to provide services to the user and may verify the user identity information in response to a request of another service providing server.

Afterwards, the blockchain network 500 may perform distributive processing of data, i.e., connecting blocks of the data in a chain-like manner and recording them in distributed ledgers, and may save the user certificate including a user commitment in the distributed ledgers. Herein, the blockchain network 500 may be configured as a private blockchain network and/or a public blockchain network.

Figure 2:
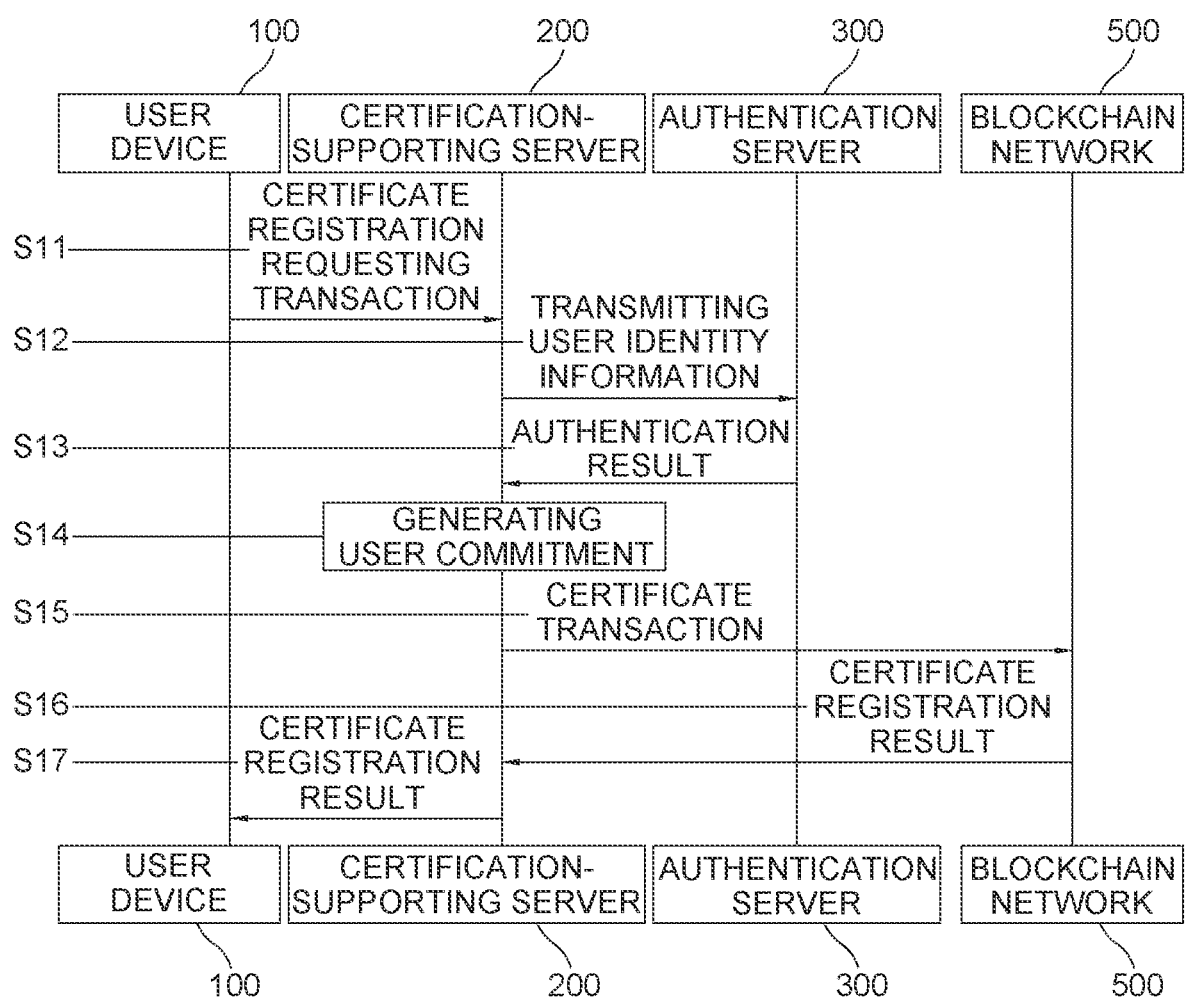
FIG. 2 is a drawing schematically illustrating a process of registering a user certificate using a method for managing the certificate based on the zero-knowledge proof using the blockchain network in accordance with one example embodiment of the present disclosure.

A process of registering the user certificate according to a method of managing the certificate based on the zero-knowledge proof using the blockchain network 500 in accordance with one example embodiment of the present disclosure is described by referring to FIG. 2 as follows.

First, in response to confirming the user identity information to be used for the certificate by the user, the user device 100 may generate user trap information by using a secret key of the user.

Herein, the user identity information may include any information related to the user such as a name, an age, an address, a phone number, a gender, a social security number, an occupation, an ID, permission information, etc., and the secret key is a secret value only known to the user. For example, the secret key may be a specific secret value generated by using a user private key or in a random manner. Further, if generators of a commitment scheme are g and h, the user trap information may be generated by using the secret key of the user, for instance h^(the secret key). Herein, said h^(the secret key) represents h to the power of the secret key.

Furthermore, the user device 100 may transmit a certificate registration requesting transaction including at least one piece of user identity information corresponding to the user and the user trap information generated by using the secret key of the user to the certification-supporting server 200, at a step of S11.

Next, the certification-supporting server 200, in response to acquiring the certificate registration requesting transaction including at least one piece of user identity information corresponding to the user and the user trap information generated by using the secret key of the user from the user device 100, may authenticate the user identity information included in the certificate registration requesting transaction.

Herein, the certification-supporting server 200 may transmit the user identity information to the authentication server 300, at a step of S12, to thereby instruct the authentication server 300 to authenticate whether the user identity information corresponds to the user. And, in response to the authentication server 300 transmitting an authentication result, at a step of S13, the certification-supporting server 200 may receive the authentication result to authenticate the user identity information. Herein, the authentication server 300 may authenticate whether the user identity information corresponds to the user when the user identity information requested for authentication matches a previously stored user information.

Next, in response to authenticating that the user identity information corresponds to the user according to the authentication result acquired from the authentication server 300, the certification-supporting server 200 may generate the user commitment corresponding to the user identity information by applying an operation of the commitment scheme to the user identity information and the user trap information included in the certificate registration requesting transaction, at a step of S14.

Herein, the commitment scheme binds the user identity information to prevent an alteration thereof and hides the user identity information to prevent an estimation thereof from the user commitment. Moreover, the certification-supporting server 200 may output the user commitment comm(the user identity information) which can be calculated by g^(the user identity information)*h^(the secret key) through the operation of the commitment scheme. Herein, said comm(the user identity information) represents a function "comm" of "the user identity information" such as f(x), i.e., a function "f" of "x". That is, it is possible to bind the user identity information without needing to disclose the user identity information and the secret key of the user through the user commitment scheme, and thus the user identity information registered through this method cannot be altered.

Further, the certification-supporting server 200 may transmit a certificate transaction including the user commitment to the blockchain network 500, at a step of S15, to thereby instruct the blockchain network 500 to register the certificate transaction in a distributed ledger.

Herein, the certificate transaction may also include a certification-supporting server commitment to be used for a confirmation of the certification-supporting server 200, in addition to the user commitment. Also, the certificate transaction may further include confirmation information that can be used to allow the user identity information to be indirectly confirmed by allowing a third party to check the confirmation information without a direct confirmation as to the user identity information itself by the third party. Said confirmation information may be information such as a confirmed age of the user to be an adult, a confirmed address of the user to be in a specific province, a confirmed occupation of the user to be a specific occupation, etc. In addition, the certificate transaction may include information processed by other information corresponding to information of the user or the certification-supporting server 200, with no direct disclosing of the information of the user or the certification-supporting server 200.

Afterwards, the certification-supporting server 200 may acquire information related to a certificate registration result of the user from the blockchain network 500, at a step of S16. Herein, the certificate registration result of the user may include a transaction ID corresponding to the certificate transaction. Additionally, the certification-supporting server 200 may transmit information corresponding to the certificate registration result acquired from the blockchain network 500 to the user device 100, at a step of S17, to thereby allow the user to confirm the certificate registration result.

Figure 3:
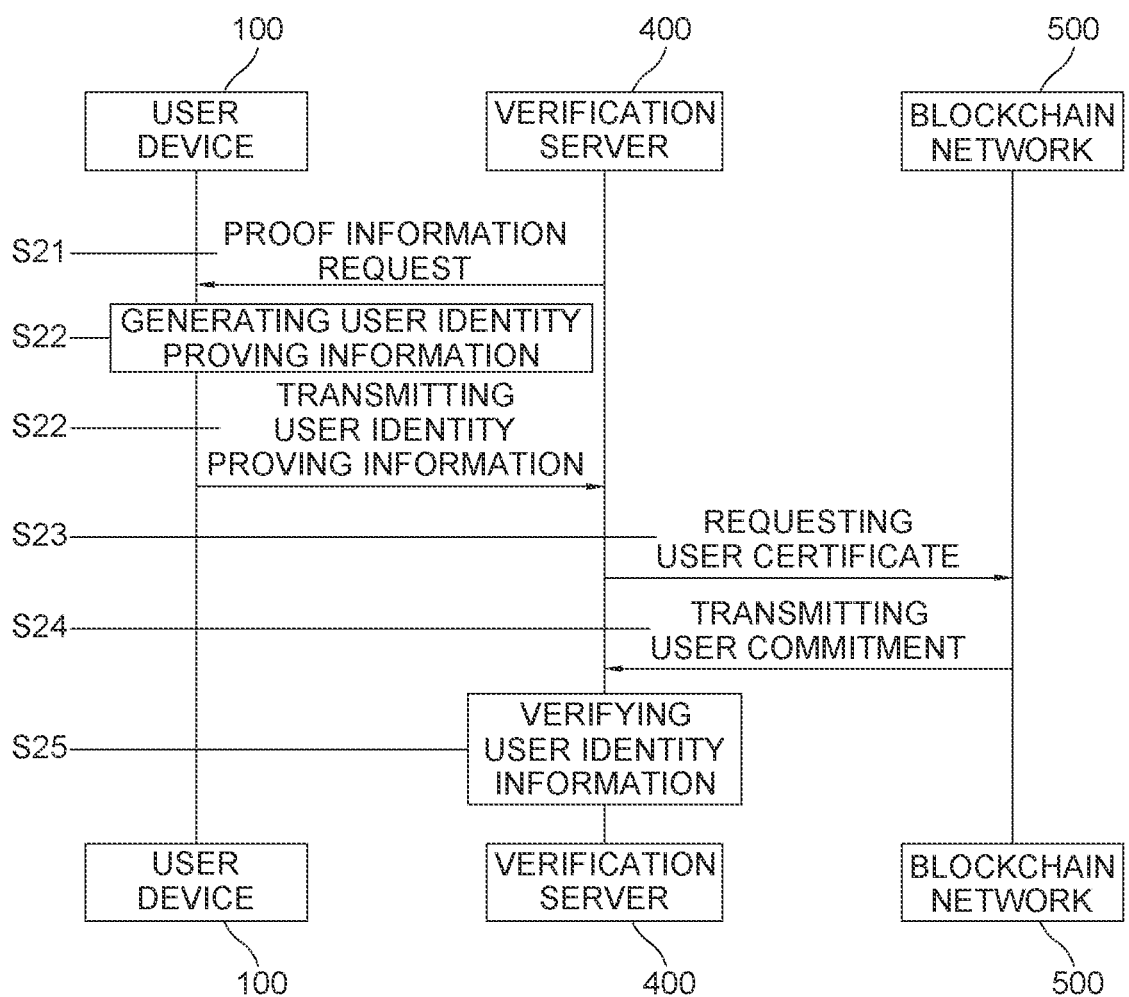
FIG. 3 is a drawing schematically illustrating a process of verifying the user certificate according to the method for managing the certificate based on the zero-knowledge proof using the blockchain network in accordance with one example embodiment of the present disclosure.

On condition that the user commitment generated by applying the operation of the commitment scheme to the user identity information and the user trap information has been registered on the distributed ledger of the blockchain network as mentioned above by using FIG. 2, a process of verifying the user certificate according to the method of managing the certificate based on the zero-knowledge proof using the blockchain network 500 in accordance with one example embodiment of the present disclosure is described by referring to FIG. 3 as follows.

As mentioned above by using FIG. 2, if the generators of the commitment scheme are represented as said g and said h, the user trap information may be represented as said h^(the secret key), and the user commitment, which is represented as comm(the user identity information)=g^(the user identity information)*h^(the secret key), may be registered in the blockchain network 500. Herein said h^(the secret key) represents said h to the power of the secret key, and said g^(the user identity information) represents said g to the power of the user identity information.

On condition as above, in response to acquiring a user authentication request from the user device 100 or acquiring the user authentication request from a service providing server, the verification server 400 may transmit a proof information request to the user device 100 in order to acquire proof information corresponding to the user identity information, at a step of S21.

Then, according to the proof information request corresponding to the user identity information from the verification server 400, the user device 100 may (i) generate random nonces, (ii) verify the user identity information by using the commitment scheme, and (iii) generate user identity proving information corresponding to the random nonces in order to check whether the user identity information satisfies a certain requirement, at a step of S22. Herein, the certain requirement may be related to a state of the user corresponding to the user identity information, that is, may be a requirement that can be used to check whether the user satisfies it without needing to check the actual user identity information, such as whether the user is an adult, whether the specific province is part of the user's address, and whether the specific occupation is the user's occupation, etc.

Figure 4:
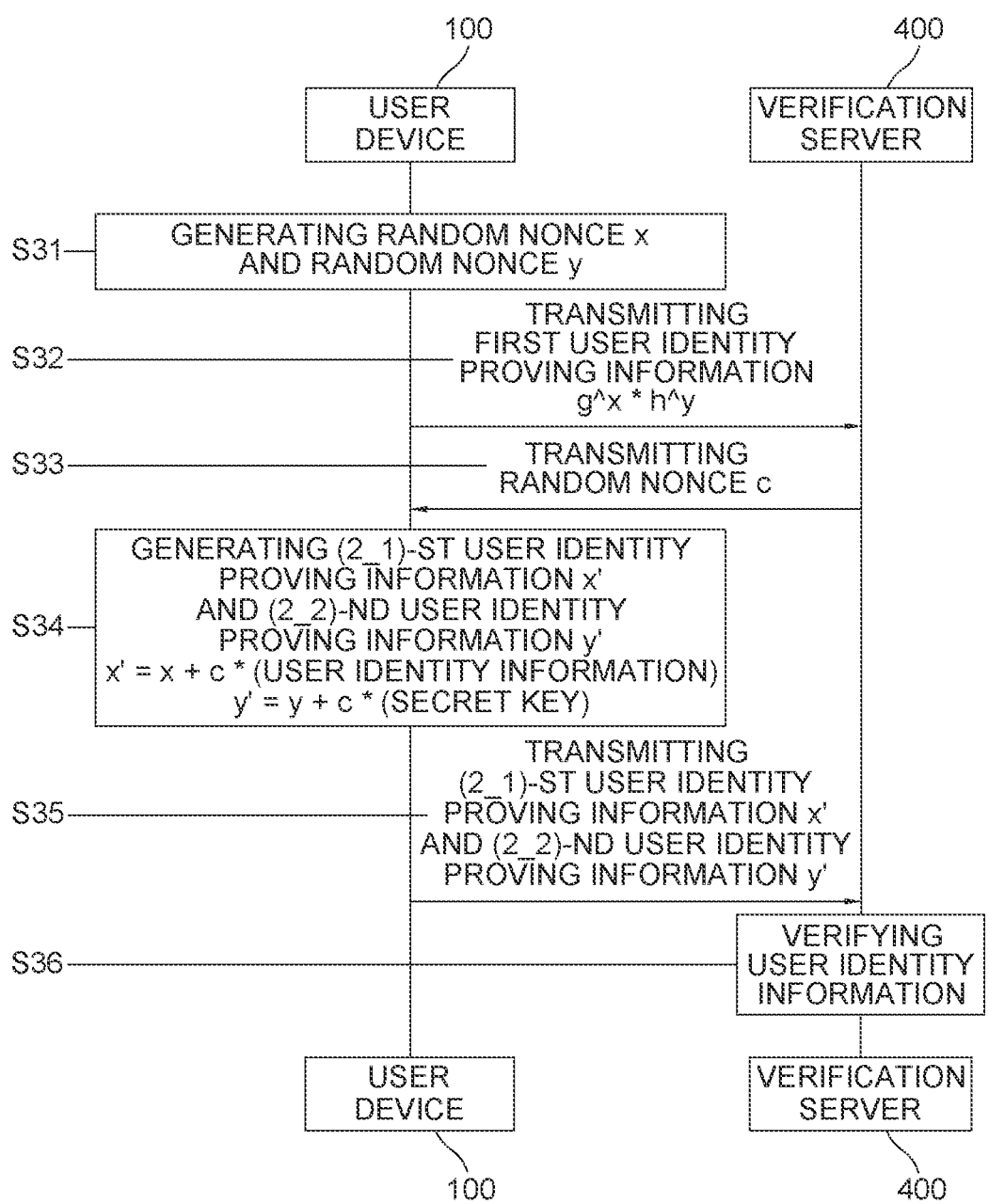
FIG. 4 is a drawing schematically illustrating a process of generating proof information to be used for verifying the user certificate according to the method for providing the certification service based on the zero-knowledge proof using the blockchain network in accordance with one example embodiment of the present disclosure.

Herein, by referring to FIG. 4, the user device 100 may generate a random nonce x and a random nonce y, at a step of S31. Further, the user device 100 may generate first user identity proving information g^x*h^y corresponding to the random nonce x and the random nonce y by using the commitment scheme, and transmit the first user identity proving information to the verification server 400, at a step of S32. Next, the verification server 400 may generate and transmit a random nonce c to the user device 100, at a step of S33, and the user device 100 may generate (2_1)-st user identity proving information $x'=x+c*$(user identity information) and (2_2)-nd user identity proving information $y'=y+c*$(secret key) by referring to the user identity information used in registering the user certificate, the secret key used in registering the user certificate, the random nonce x, the random nonce y, and the random nonce c, at a step of S34. Furthermore, the user device 100 may transmit the generated (2_1)-st user identity proving information x' and the generated (2_2)-nd user identity proving information y' to the verification server 400, at a step of S35.

Figure 5:
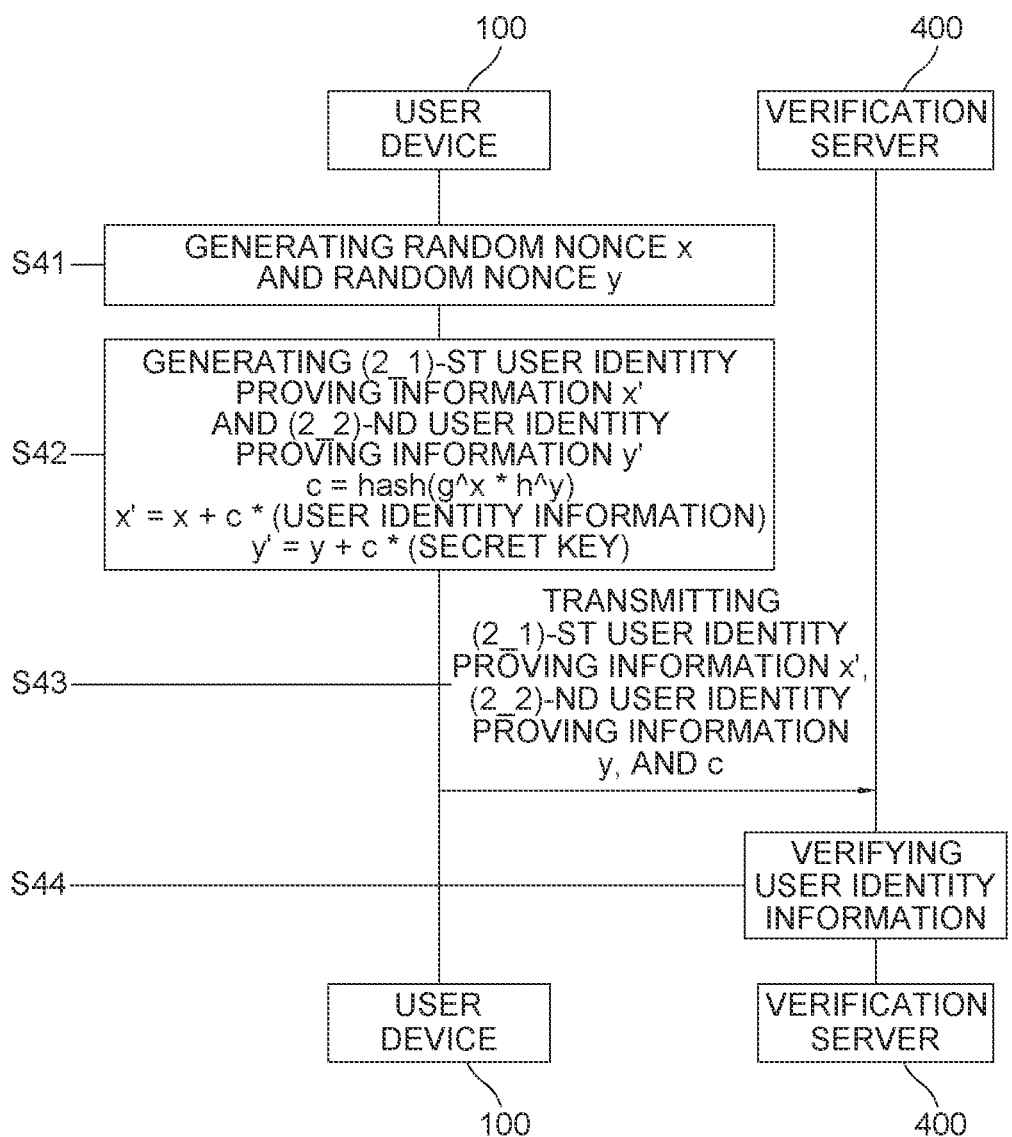
FIG. 5 is a drawing schematically illustrating the process of generating the proof information to be used for verifying the user certificate according to another method for managing the certificate based on the zero-knowledge proof using the blockchain network in accordance with another example embodiment of the present disclosure.

Unlike above, referring to FIG. 5, the user device 100 may generate the random x and the random nonce y, at a step of S41. And further, the user device 100 may generate the first user identity proving information $g^x * h^y$ corresponding to the random nonce x and the random nonce y by using the commitment scheme. Next, the user device 100 may (i) generate a hash value $c=hash(g^x*h^y)$ by using the first user identity proving information $g^x*h^y$, and (ii) generate the (2_1)-st user identity proving information $x'=x+c*$(user identity information) and the (2_2)-nd user identity proving information $y'=y+c*$(secret key) by referring to the user identity information, the secret key, the random nonce x, the random nonce y, and the hash value c, at a step of S42. Furthermore, the user device 100 may transmit the generated (2_1)-st user identity proving information x', the generated (2_2)-nd user identity proving information y', and the hash value c to the verification server 400, at a step of S43.

Referring back to FIG. 3, in response to acquiring the user identity proving information from the user device 100, the verification server 400 may request the blockchain network 500 for the user certificate, at a step of S23, to thereby instruct the blockchain network 500 to transmit the user certificate, that is, the user commitment to the verification server 400, at a step of S24.

Next, the verification server 400 may verify the user identity information by using (1) the user commitment acquired from the blockchain network 500 and (2) the user identity proving information acquired from the user device 100, at a step of S25, thereby allowing the user to be authenticated.

For example, by referring to FIG. 4, the verification server 400 may check whether (1) a first verification value $g^x*h^y*comm$(the user identity information)$^c$ generated by referring to the first user identity proving information $g^x*h^y$ and the user commitment comm(the user identity information) and (2) a second verification value $g^{x'}*h^{y'}$ generated by referring to the (2_1)-st user identity proving information x' and the (2_2)-nd user identity proving information y' correspond with each other, thereby verifying the user identity information at step S36.

That is, the second verification value $g^{x'}*h^{y'}$ may be represented as $g^{(x+c*(\text{the user identity information}))}*h^{(y+c*(\text{the secret key}))}$. Also, $g^{(x+c*(\text{the user identity information}))}*h^{(y+c*(\text{the secret key}))}$ may be represented as $g^x*h^y*g^{(c*(\text{the user identity information}))}*h^{(c*(\text{the secret key}))}$. Additionally, $g^x*h^y*g^{(c*(\text{the user identity information}))}*h^{(c*(\text{the secret key}))}$ may again be represented as $g^x*h^y*(g^{(\text{the user identity information})})*h^{(\text{the secret key})})^c$, and then $g^x*h^y*(g^{(\text{the user identity information})}*h^{(\text{the secret key})})^c$ may be represented as the first verification value $g^x*h^y*comm$(the user identity information)$^c$.

Unlike above, by referring to FIG. 5, the verification server 400 may check whether (1) a verification value, i.e., $hash((g^{x'}*h^{y'}/(comm(\text{the user identity information})^c))$, generated by referring to the (2_1)-st user identity proving information x', the (2_2)-nd user identity proving information y', the hash value c, and the user commitment comm(the user identity information) and (2) the hash value c correspond with each other, thereby verifying the user identity information at step S44.

That is the verification value, i.e., $hash((g^{x'}*h^{y'})/(comm(\text{the user identity information})^c))$, may be represented as $hash((g^{(x+c*(\text{the user identity information}))}*h^{(y+c*(\text{the secret key}))})/(comm(\text{the user identity information})^c))$. And then $hash((g^{(x+c*(\text{the user identity information}))}*h^{(y+c*(\text{the secret key}))})/(comm(\text{the user identity information})^c))$ may be represented as $hash((g^x*h^y*g^{(c*\text{the user identity information})}*h^{(c*\text{the secret key})})/(comm(\text{the user identity information})^c))$. Also, $hash((g^x*h^y*g^{(c*\text{the user identity information})}*h^{(c*\text{the secret key})})/(comm(\text{the user identity information})^c))$ may be $hash(g^x*h^y)$, which is equal to the hash value c.

That is, according to an example embodiment of the present disclosure, it is possible to bind the user identity information so that it becomes unalterable by the user without needing to disclose the user identity information and the secret key, to hide the user identity information and the secret key during verification without disclosing the user identity information and the secret key, and to prohibit an estimation of the user by generating the identity proving information using random nonces.

The present invention has an effect of safely saving the user identity information without disclosing it.

The present invention has another effect of being able to verify the user identity information without having to disclose the user identity information.

The present invention has still another effect of preventing unwanted identification caused by using information provided for verification corresponding to the user identity information.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. The aforementioned hardware device can work as more than a software module to perform the action of the present disclosure and they can do the same in the opposite case.

The aforementioned hardware device can work as more than a software module to perform the action of the present disclosure and they can do the same in the opposite case.

Accordingly, the thought of the present disclosure must not be confined to the explained embodiments, and the following patent claims as well as everything including variations equal or equivalent to the patent claims pertain to the category of the thought of the present disclosure.

What is claimed is:
1. A method for managing a certificate based on a zero-knowledge proof using a blockchain network, comprising steps of;
   (a) on condition that a user commitment, generated by applying an operation of a commitment scheme to user identity information and user trap information, has been registered on a distributed ledger of the blockchain network, wherein the user trap information is generated by using a secret key of a user, in response to acquiring a proof information request corresponding to the user identity information from a verification server, a user device (i) generating random nonces, (ii) verifying the user identity information by using the commitment scheme, and (iii) generating user identity proving information corresponding to the random nonces in order to check whether the user identity information satisfies a certain requirement; and
   (b) the user device transmitting the user identity proving information to the verification server, to thereby instruct the verification server to (i) acquire the user commitment from the blockchain network, (ii) verify the user identity information by using the user commitment acquired from the blockchain network and the user identity proving information acquired from the user device, and (vi) verify whether the user identity information satisfies the certain requirement;
   wherein generators of the commitment scheme are represented as g and h, the user trap information is represented as $h^\wedge$(the secret key), wherein said $h^\wedge$(the secret key) represents said h to the power of the secret key, and the user commitment is represented as comm (the user identity information)=$g^\wedge$(the user identity information)*$h^\wedge$(the secret key), wherein said $g^\wedge$(the user identity information) represents said g to the power of the user identity information, and
   wherein, at the step of (a), the user device (i) generates a random nonce x and a random nonce y, (ii) generates first user identity proving information $g^\wedge$ x*by corresponding to the random nonce x and the random nonce y by using the commitment scheme, (iii) transmits the first user identity proving information to the verification server, and (iv) in response to the verification server transmitting a random nonce c, generates (21)-st user identity proving information x'=x+c*(user identity information) and (2_2)-nd user identity proving information y'=y+c*(secret key) by referring to the user identity information, the secret key, the random nonce x, the random nonce y, and the random nonce c, and
   wherein, at the step of (b), the user device transmits the (2_1)-st user identity proving information x' and the (2_2)-nd user identity proving information y' to the verification server, to thereby instruct the verification server to check whether (1) a first verification value $g^\wedge x * h^\wedge y *$ comm(the user identity information)$^\wedge$c generated by referring to the first user identity proving information $g^\wedge x * h^\wedge y$ and the user commitment comm (the user identity information) and (2) a second verification value $g^\wedge x' * h^\wedge y'$ generated by referring to the (21)-st user identity proving information x' and the (2_2)-nd user identity proving information y' correspond with each other, thus verifying the user identity information.

2. A method for managing a certificate based on a zero-knowledge proof using a blockchain network, comprising steps of:
   (a) on condition that a user commitment, generated by applying an operation of a commitment scheme to user identity information and user trap information, has been registered on a distributed ledger of the blockchain network, wherein the user trap information is generated by using a secret key of a user, in response to acquiring a proof information request corresponding to the user identity information from a verification server, a user device (i) generating random nonces, (ii) verifying the user identity information by using the commitment scheme, and (iii) generating user identity proving information corresponding to the random nonces in order to check whether the user identity information satisfies a certain requirement; and
   (b) the user device transmitting the user identity proving information to the verification server, to thereby instruct the verification server to (i) acquire the user commitment from the blockchain network, (ii) verify the user identity information by using the user commitment acquired from the blockchain network and the user identity proving information acquired from the user device, and (vi) verify whether the user identity information satisfies the certain requirement;
   wherein generators of the commitment scheme are represented as g and h, the user trap information is represented as $h^\wedge$(the secret key), wherein said $h^\wedge$(the secret key) represents said h to the power of the secret key, and the user commitment is represented as comm (the user identity information)=$g^\wedge$(the user identity information) * $h^\wedge$(the secret key), wherein said $g^\wedge$(the user identity information) represents said g to the power of the user identity information, and
   wherein, at the step of (a), the user device (i) generates a random nonce x and a random nonce y, (ii) generates first user identity proving information $g^\wedge x * h^\wedge y$ corresponding to the random nonce x and the random nonce y by using the commitment scheme, (iii) generates a hash value c=hash($g^\wedge x * h^\wedge y$) by using the first user identity proving information $g^\wedge x * h^\wedge y$, and (iv) generates (2_1)-st user identity proving information x'=x+c*(user identity information) and (2_2)-nd user identity proving information y'=y+c*(secret key) by referring to the user identity information, the secret key, the random nonce x, the random nonce y, and the hash value c, and
   wherein, at the step of (b), the user device transmits the (2_1)-st user identity proving information x', the (2_2)-nd user identity proving information y', and the hash value c to the verification server, to thereby instruct the verification server to check whether (1) a verification value hash(($g^\wedge x' * h^\wedge y'$/(comm(the user identity information)$^\wedge$c)) generated by referring to the (2_1)-st user identity proving information x', the (2_2)-nd user identity proving information y', the hash value c, and the user commitment comm(the user identity information) and (2) the hash value c correspond with each other, thus verifying the user identity information.

3. A user device for managing a certificate based on a zero-knowledge proof using a blockchain network, comprising:
   at least one memory that stores instructions; and
   at least one processor configured to execute the instructions to perform processes of: (I) on condition that a user commitment, generated by applying an operation of a commitment scheme to user identity information and user trap information, has been registered on a distributed ledger of the blockchain network, wherein the user trap information is generated by using a secret key of a user, in response to acquiring a proof information request corresponding to the user identity information from a verification server, (i) generating random nonces, (ii) verifying the user identity information by using the commitment scheme, and (iii) generating user identity proving information corresponding to the random nonces in order to check whether the user identity information satisfies a certain requirement; and (II) transmitting the user identity proving information to the verification server, to thereby instruct the verification server to (i) acquire the user commitment from the blockchain network, (ii) verify the user identity information by using the user commitment acquired from the blockchain network and the user identity proving information acquired from the user device, and (vi) verify whether the user identity information satisfies the certain requirement;

wherein generators of the commitment scheme are represented as g and h, the user trap information is represented as $h^{\wedge}$(the secret key), wherein said $h^{\wedge}$(the secret key) represents said h to the power of the secret key, and the user commitment is represented as comm (the user identity information)=$g^{\wedge}$(the user identity information)*$h^{\wedge}$(the secret key), wherein said $g^{\wedge}$(the user identity information) represents said g to the power of the user identity information, and wherein, at the process of (I), the processor (i) generates a random nonce x and a random nonce y, (ii) generates first user identity proving information $g^{\wedge}x*h^{\wedge}y$ corresponding to the random nonce x and the random nonce y by using the commitment scheme, (iii) transmits the first user identity proving information to the verification server, and (iv) in response to the verification server transmitting a random nonce c, generates (2_1)-st user identity proving information x'=x+c*(user identity information) and (2_2)-nd user identity proving information y'=y+c*(secret key) by referring to the user identity information, the secret key, the random nonce x, the random nonce y, and the random nonce c, and wherein, at the process of (II), the processor transmits the (2_1)-st user identity proving information x' and the (2_2)-nd user identity proving information y' to the verification server, to thereby instruct the verification server to check whether (1) a first verification value $g^{\wedge}x*h^{\wedge}y*$comm(the user identity information)$^{\wedge}c$ generated by referring to the first user identity proving information $g^{\wedge}x*h^{\wedge}y$ and the user commitment comm (the user identity information) and (2) a second verification value $g^{\wedge}x'*h^{\wedge}y'$ generated by referring to the (2_1)-st user identity proving information x' and the (2_2)-nd user identity proving information y' correspond with each other, thus verifying the user identity information.

4. A user device for managing a certificate based on a zero-knowledge proof using a blockchain network, comprising: at least one memory that stores instructions; and at least one processor configured to execute the instructions to perform processes of: (I) on condition that a user commitment, generated by applying an operation of a commitment scheme to user identity information and user trap information, has been registered on a distributed ledger of the blockchain network, wherein the user trap information is generated by using a secret key of a user, in response to acquiring a proof information request corresponding to the user identity information from a verification server, (i) generating random nonces, (ii) verifying the user identity information by using the commitment scheme, and (iii) generating user identity proving information corresponding to the random nonces in order to check whether the user identity information satisfies a certain requirement; and (II) transmitting the user identity proving information to the verification server, to thereby instruct the verification server to (i) acquire the user commitment from the blockchain network, (ii) verify the user identity information by using the user commitment acquired from the blockchain network and the user identity proving information acquired from the user device, and (vi) verify whether the user identity information satisfies the certain requirement;

wherein generators of the commitment scheme are represented as g and h, the user trap information is represented as $h^{\wedge}$(the secret key), wherein said $h^{\wedge}$(the secret key) represents said h to the power of the secret key, and the user commitment is represented as comm (the user identity information)=$g^{\wedge}$(the user identity information)*$h^{\wedge}$(the secret key), wherein said $g^{\wedge}$(the user identity information) represents said g to the power of the user identity information, and wherein, at the process of (I), the processor (i) generates a random nonce x and a random nonce y, (ii) generates first user identity proving information $g^{\wedge}x*h^{\wedge}y$ corresponding to the random nonce x and the random nonce y by using the commitment scheme, (iii) generates a hash value c=hash($g^{\wedge}x*h^{\wedge}y$) by using the first user identity proving information $g^{\wedge}x*h^{\wedge}y$, and (iv) generates (2_1)-st user identity proving information x'=x+c*(user identity information) and (2_2)-nd user identity proving information y'=y+c*(secret key) by referring to the user identity information, the secret key, the random nonce x, the random nonce y, and the hash value c, and wherein, at the process of (II), the processor transmits the (2_1)-st user identity proving information x', the (2_2)-nd user identity proving information y', and the hash value c to the verification server, to thereby instruct the verification server to check whether (1) a verification value hash(($g^{\wedge}x'*h^{\wedge}y'$/(comm(the user identity information)$^{\wedge}c$)) generated by referring to the (2_1)-st user identity proving information x', the (2_2)-nd user identity proving information y', the hash value c, and the user commitment comm(the user identity information) and (2) the hash value c correspond with each other, thus verifying the user identity information.

\* \* \* \* \*